United States Patent
Chen et al.

(10) Patent No.: US 9,009,824 B1
(45) Date of Patent: Apr. 14, 2015

(54) METHODS AND APPARATUS FOR DETECTING PHISHING ATTACKS

(71) Applicants: Rung-Chi Chen, Cingshuei (TW);
Ting-Hung Chiu, Zhongli (TW);
Ching-Cheng Hsu, Taipei (TW)

(72) Inventors: Rung-Chi Chen, Cingshuei (TW);
Ting-Hung Chiu, Zhongli (TW);
Ching-Cheng Hsu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 176 days.

(21) Appl. No.: 13/828,029

(22) Filed: Mar. 14, 2013

(51) Int. Cl.
*H04L 29/06* (2006.01)

(52) U.S. Cl.
CPC ........ *H04L 63/1425* (2013.01); *H04L 63/1416* (2013.01); *H04L 63/0236* (2013.01); *H04L 63/1483* (2013.01)

(58) Field of Classification Search
CPC . H04L 63/1483; H04L 63/14; H04L 63/1416; H04L 63/0236; H04L 63/0245; H04L 63/1425
USPC .................................................... 726/22–24
See application file for complete search history.

(56) References Cited

U.S. PATENT DOCUMENTS

| | | | |
|---|---|---|---|
| 7,021,534 B1 | 4/2006 | Kiliccote | |
| 7,802,298 B1 | 9/2010 | Hong et al. | |
| 7,895,515 B1 | 2/2011 | Oliver et al. | |
| 2005/0160330 A1 | 7/2005 | Embree et al. | |
| 2006/0064374 A1 | 3/2006 | Helsper et al. | |
| 2006/0070126 A1 | 3/2006 | Grynberg et al. | |
| 2006/0095966 A1* | 5/2006 | Park .............................. | 726/22 |
| 2006/0101120 A1 | 5/2006 | Helsper et al. | |
| 2006/0123464 A1 | 6/2006 | Goodman et al. | |
| 2006/0123478 A1 | 6/2006 | Rehfuss et al. | |
| 2006/0168066 A1 | 7/2006 | Helsper et al. | |
| 2007/0112814 A1 | 5/2007 | Cheshire | |
| 2007/0282739 A1 | 12/2007 | Thomsen | |
| 2008/0028444 A1 | 1/2008 | Loesch et al. | |
| 2008/0082662 A1 | 4/2008 | Dandliker et al. | |
| 2012/0272330 A1* | 10/2012 | Soghoian et al. ............... | 726/26 |
| 2012/0303348 A1* | 11/2012 | Lu et al. .......................... | 703/13 |
| 2012/0324580 A1* | 12/2012 | Glasser et al. .................. | 726/24 |

OTHER PUBLICATIONS

Powerful Phishing Detection with Innovative Technology from Trend Micro, 2 sheet [retrieved on Feb. 28, 2013], retrieved from the Internet: http://blog.trendmicro.com/trendabs-security-intelligence/powerful-phishing-detection-wit . . . .
Modularity (networks)—from Wikipedia, the free encyclopedia, 6 sheets (retrieved on Mar. 4, 2013], retrieved from the internet: http://en.wikipedia.org.wiki/Modularity_(networks).
Modularity—from Wikipedia, the free encyclopedia, 9 sheets (retrieved on Jan. 22, 2013], retrieved from the internet: http://en.wikipedia.org.wiki/Modularity.
Centrality—from Wikipedia, the free encyclopedia, 7 sheets (retrieved on Jan. 22, 2013], retrieved from the internet: http://en.wikipedia.org.wiki/Modularity.
M.E. J. Newman "Modularity and community structure in networks", published online on May 24, 2006, 7 sheets [retrieved on Mar. 4, 2013], retrieved from the internet: http://www.ncbi.nlm.nih.gov/pmc/articles/PMC1482622/.

* cited by examiner

*Primary Examiner* — Hadi Armouche
*Assistant Examiner* — Sher Khan
(74) *Attorney, Agent, or Firm* — Okamoto & Benedicto LLP (57) ABSTRACT

Phishing is detected by creating a message transfer agent (MTA) map, with each point on the MTA map referencing an MTA. Points on the MTA map are connected based on a number of emails with same signature sent by MTAs represented on the MTA map. Reference MTA groups are identified from the map. Phishing is detected when an MTA sent an email with the same signature as that of emails sent by MTAs belonging to a reference MTA group but the MTA is not a member of the reference MTA group.

6 Claims, 9 Drawing Sheets

METHODS AND APPARATUS FOR DETECTING PHISHING ATTACKS

BACKGROUND OF THE INVENTION

1. Field of the Invention

The present invention relates generally to computer security, and more particularly but not exclusively to methods and apparatus for detecting phishing.

2. Description of the Background Art

Phishing involves stealing information, such as usernames, passwords, and credit card information, by mimicking a legitimate organization in Internet communications. Phishing is typically perpetrated by sending emails that include a link to a webpage of a malicious website or other harmful content. Victims are fooled into clicking the link because the emails are designed to look like they are from a legitimate organization trusted by the victim.

Detecting phishing emails by analyzing the email content is difficult because a phishing email is designed to look like a legitimate email. Patterns or signatures for detecting phishing emails by pattern matching will also match legitimate emails, raising the number of false positives to unacceptable levels. Detecting phishing emails by uniform resource locator (URL) analysis is also problematic because phishing sites are constantly being relocated and their numbers are increasing.

SUMMARY

In one embodiment, phishing is detected by creating a message transfer agent (MTA) map, with each point on the MTA map referencing an MTA. Points on the MTA map are connected based on a number of emails with same signature sent by MTAs represented on the MTA map. Reference MTA groups are identified from the map. Phishing is detected when an MTA sent an email with the same signature as that of emails sent by MTAs belonging to a reference MTA group but the MTA is not a member of the reference MTA group.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
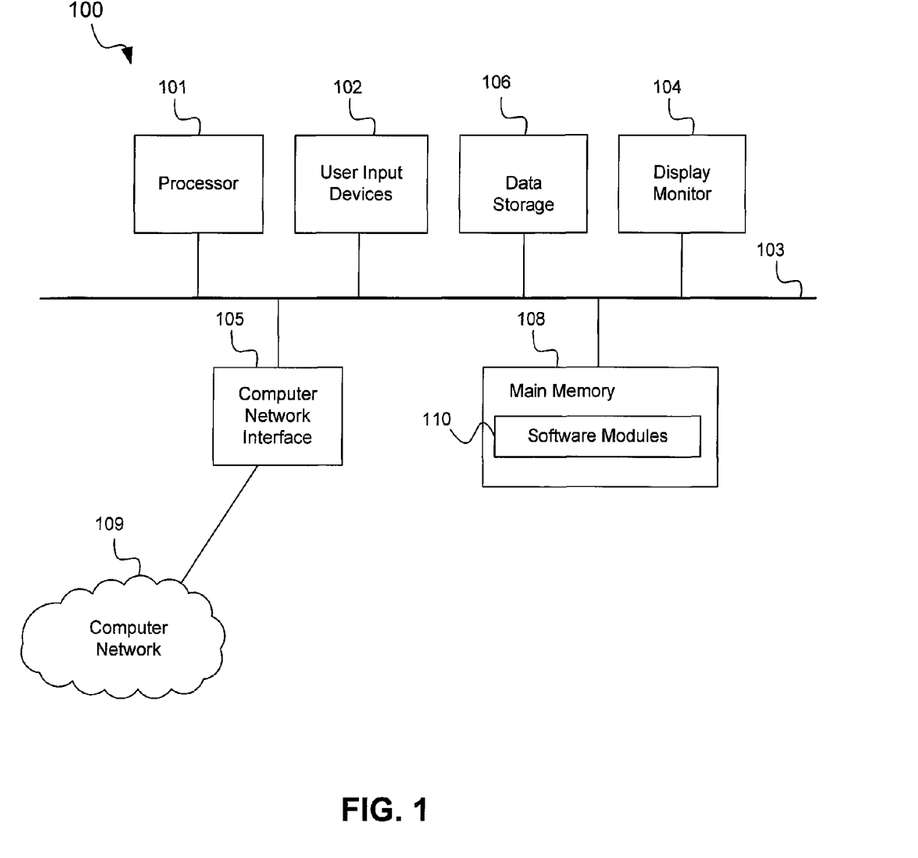
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a phishing analysis system, a security system, or other computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code, i.e., computer instructions, stored non-transitory in the main memory 108 for execution by the processor 101. Execution of the software modules 110 by the processor 101 causes the computer 100 to perform the functions of the software modules 110. As an example, the software modules 110 may comprise an analysis module and a phishing detector when the computer 100 is employed as a phishing analysis system.

Figure 2:
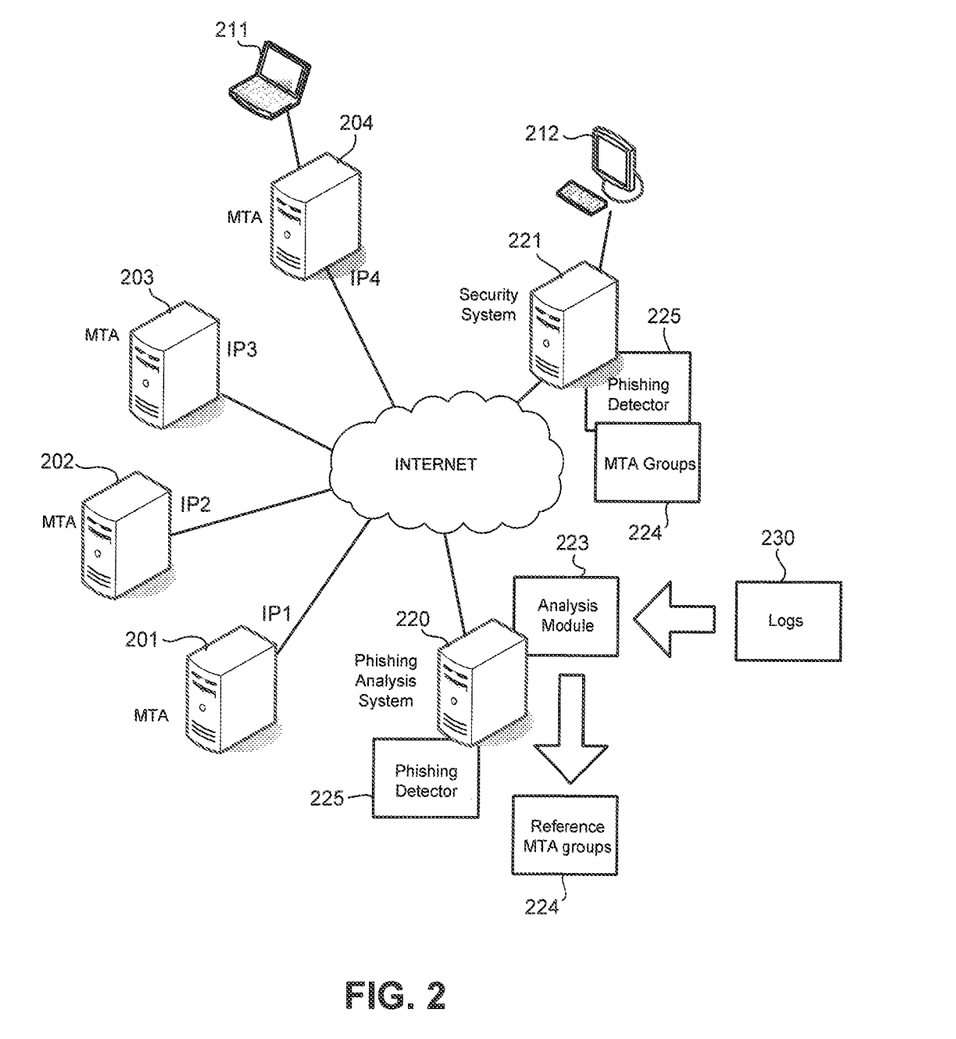
FIG. 2 shows a schematic diagram of a computer network in accordance with an embodiment of the present invention.

FIG. 2 shows a schematic diagram of a computer network in accordance with an embodiment of the present invention. In the example of FIG. 2, the computer network includes mail transfer agents 201-204, a phishing analysis system 220, and a security system 221. A message transfer agent (MTA) may comprise one or more computers that transfer emails from one computer to another. For example, the MTA 204 may transfer an email from the computer 211 to the MTA 201. In one embodiment, the MTAs 201-204 comprise conventional MTAs that transfer emails over the Internet. There are hundreds if not thousands of MTAs on the Internet, but only a few are shown in FIG. 2 for clarity of illustration. In the example of FIG. 2, the MTAs 201-204 have IP (Internet protocol) addresses IP1-IP4, respectively.

The phishing analysis system 220 may comprise one or more computers that generate an MTA map from IP addresses of a plurality of MTAs and emails sent by the MTAs, connect points on the MTA map based on a number of same emails sent by the MTAs, identify reference MTA groups from the MTA map, subsequently collect signatures of emails sent by MTAs in the identified reference MTA groups, and detect phishing by identifying a particular MTA that sent an email having a same signature as emails sent by MTAs belonging to a reference MTA group but the particular MTA is not a member of the reference MTA group.

In the example of FIG. 2, the phishing analysis system 220 comprises an analysis module 223 and a phishing detector 225. In one embodiment, the analysis module 223 comprises computer-readable program code that receives logs 230 comprising IP addresses of MTAs and emails sent by the MTAs, generates an MTA map from the IP addresses of the MTAs and signatures of emails sent by the MTAs, connects points on the MTA map based on a number of same emails sent by the MTAs, and identifies reference MTA groups from the MTA map. In the example of FIG. 2, the analysis module 223 outputs the identified reference MTA groups as a listing of reference MTA groups 224. The logs 230 may comprise query logs of an antispam engine or service, for example.

In one embodiment, the phishing detector 225 comprises computer-readable program code that receives emails sent by MTAs belonging to reference MTA groups and detects a particular MTA that sent an email having a signature that is same as signatures of emails sent by MTAs belonging to a particular reference MTA group but the particular MTA is not a member of the particular reference MTA group. The phishing detector 225 may consult the listing of reference MTA groups 224 to identify members of various reference MTA groups. In one embodiment, each reference MTA group in the listing of reference MTA groups 224 comprises a plurality of MTAs that send emails having the same signature. That is, each MTA in a reference MTA group sends an email with a particular signature known to belong to that reference MTA group.

The phishing detector 225 and the listing of reference MTA groups 224 may be deployed in the phishing analysis system 220 or in some other system, such as in the security system 221. The phishing analysis module 223 may provide the listing of reference MTA groups 224 to subscribing computers, such as the security system 221 and other computer systems. The phishing analysis module 223 may also continually update the listing of reference MTA groups 224 with new data and provide the updates to the subscribing computers.

Table 1 shows examples of IP (Internet protocol) addresses of sender computers and signatures of emails sent by the sender computers in accordance with an embodiment of the present invention. In one embodiment, the signature of an email is calculated by hashing the content of the body of the email, for example. Variables, such as names of recipients and the like, may be eliminated from the signature to reveal the template of the email. That is, the signature represents a template of the email. Other ways of calculating an email signature may also be employed. In the example of Table 1, the sender IP address is the IP address of the sender computer, which in this case is a sending MTA that sent the email. The sender IP addresses and corresponding email signatures may be obtained from various logs. An email signature may be obtained directly from the log or calculated by the phishing analysis module 223 upon receipt of the email.

TABLE 1

| Signature of Email | Sender IP (MTA) |
| --- | --- |
| 000000b5c42968b913d24f6597ae8cba | 169.254.1.6 |
| 000000b5c42968b913d24f6597ae8cba | 141.113.102.114 |
| 0000032b0020eed94e8c76afa19a848b | 75.127.151.162 |
| 0000032b0020eed94e8c76afa19a848b | 169.254.1.139 |
| 0000032b0020eed94e8c76afa19a848b | 76.20.75.3 |
| 00000466ecaf16918a4a0f50a3c0f6a7 | 141.113.102.114 |
| 00000466ecaf16918a4a0f50a3c0f6a7 | 169.254.1.6 |

In one embodiment, each MTA, as represented by its IP address, is represented by a point in an MTA map that comprises a plurality of MTAs. The phishing analysis module 223 may evaluate similarity between two points, i.e., two MTAs, on the MTA map based on the number of emails with the same signatures sent by or from the two points. That is, in one embodiment, similarity of two points may be determined by comparing the signatures of emails sent by the two points. As an example, Table 2 shows the similarities of two points detected by the phishing analysis module 223 from the example of Table 1. In the example of Table 2, the MTAs having the IP addresses "169.254.1.6" and "141.113.102.114" have a similarity value of 2 because these IP addresses sent two emails with the same signatures; the MTAs having the IP addresses "75.127.151.162" and "169.254.1.139" have a similarity value of 1 because these IP addresses sent one email with the same signature; and so on.

TABLE 2

| Sender IP | Sender IP' | Similarity |
| --- | --- | --- |
| 169.254.1.6 | 141.113.102.114 | 2 (The two points sent two same emails.) |
| 75.127.151.162 | 169.254.1.139 | 1 (The two points sent one same email.) |
| 75.127.151.162 | 76.20.75.3 | 1 (The two points sent one same email.) |
| 169.254.1.139 | 76.20.75.3 | 1 (The two points sent one same email.) |

When the number of emails with the same signatures sent by two points exceeds a similarity threshold, the phishing analysis module 223 may connect the two points in the MTA map. In graph theory, this means that the two points have an edge between them. For example, assuming the similarity threshold is set to 100, two points must have sent over 100 emails with the same signatures before the phishing analysis module 223 will connect the two points on the MTA map.

Figure 3:
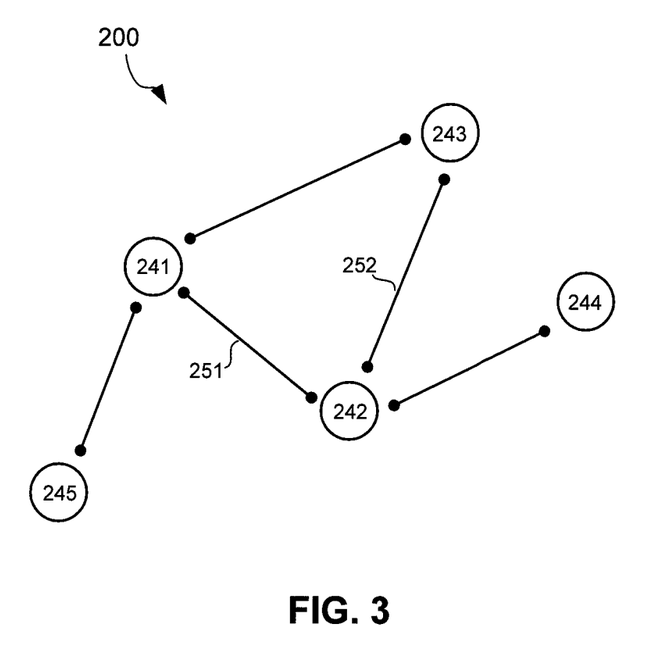
FIG. 3 shows a message transfer map (MTA) map in accordance with an embodiment of the present invention.

FIG. 3 shows an MTA map 200 in accordance with an embodiment of the present invention. In the example of FIG. 3, each of the points 241-245 represents an MTA or other sender computer. The points 241 and 242 have an edge 251 connecting them because they sent the same emails a number of times that exceeds a similarity threshold; the points 242 and 243 have an edge 252 connecting them because they sent the same emails a number of times that exceeds the similarity threshold; and so on. The phishing analysis module 223 may generate the MTA map 200, and other MTA maps, from a relatively large sample of IP addresses of sender computers and corresponding emails sent from the sender computers.

Figure 4:
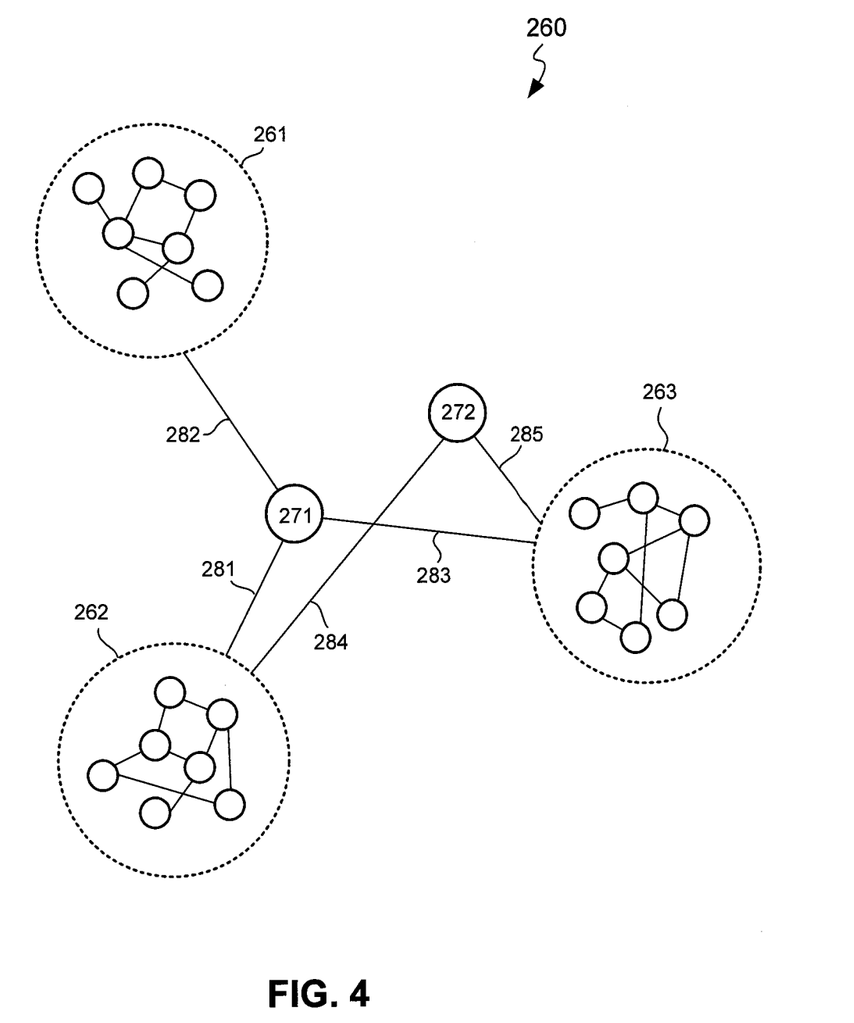
FIGS. 4-6 schematically illustrate identifying a potential reference MTA group in accordance with an embodiment.

FIG. 4 shows an MTA map 260 in accordance with an embodiment of the present invention. In the example of FIG. 4, the MTA groups 261-263 each comprises a plurality of interconnected points, i.e., MTAs with connecting edges. A point 271 represents an MTA that has an edge 282 connected to one or more points in the MTA group 261, an edge 281 connected to one or more points in the MTA group 262, and an edge 283 connected to one or more points in the MTA group 263. A point 272 represents an MTA that has an edge 284 connected to one or more points in the MTA group 262 and an edge 285 connected to one or more points in the MTA group 263.

In one embodiment, the phishing analysis module 223 processes an MTA map to identify reference MTA groups that may be employed to detect phishing. More particularly, the phishing analysis module 223 may process the MTA map 260 into reference MTA groups 224 that may be consulted by a phishing detector 2225.

In one embodiment, the phishing analysis module 223 calculates the betweenness centrality of each point on an MTA map, removes the point with the highest betweenness centrality from the MTA map, removes the edges to the point with the highest betweenness centrality, finds MTA groups that have been isolated by removal of the edges to the point with the highest betweenness centrality, and calculates the modularity of the isolated MTA groups to determine whether or not to include the MTA groups into listing of reference MTA groups 224.

Figure 5:
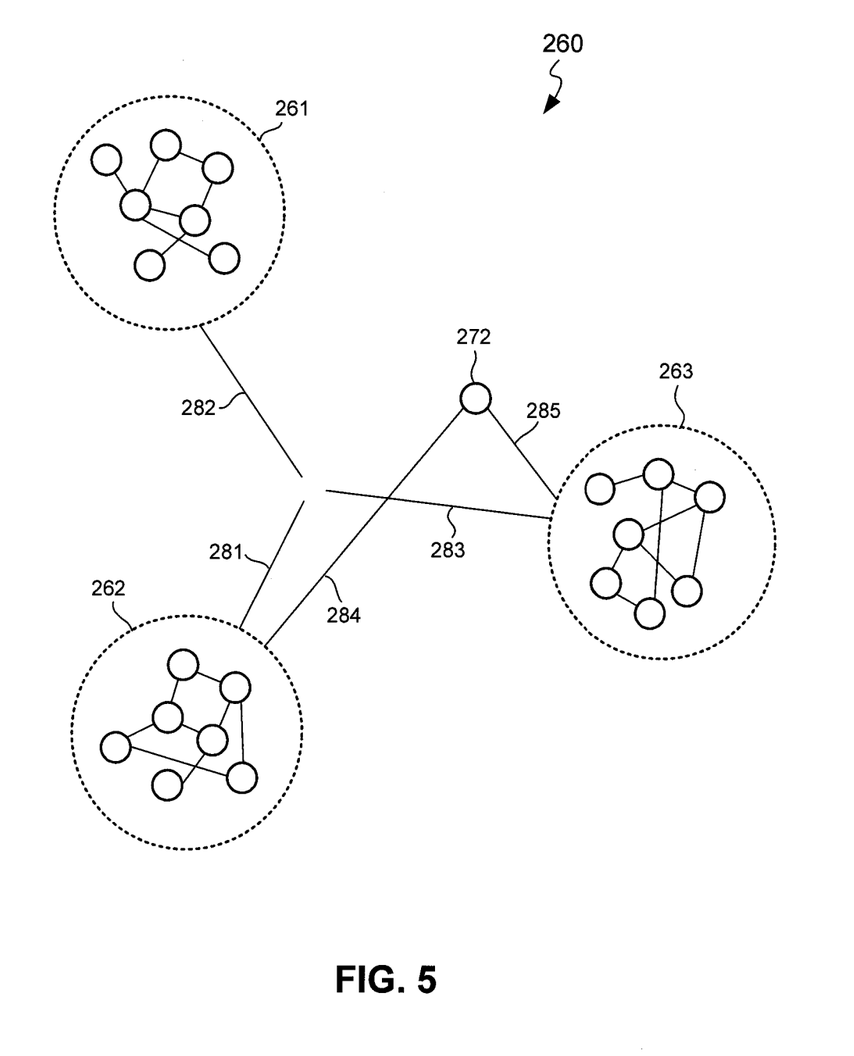
Figure 6:
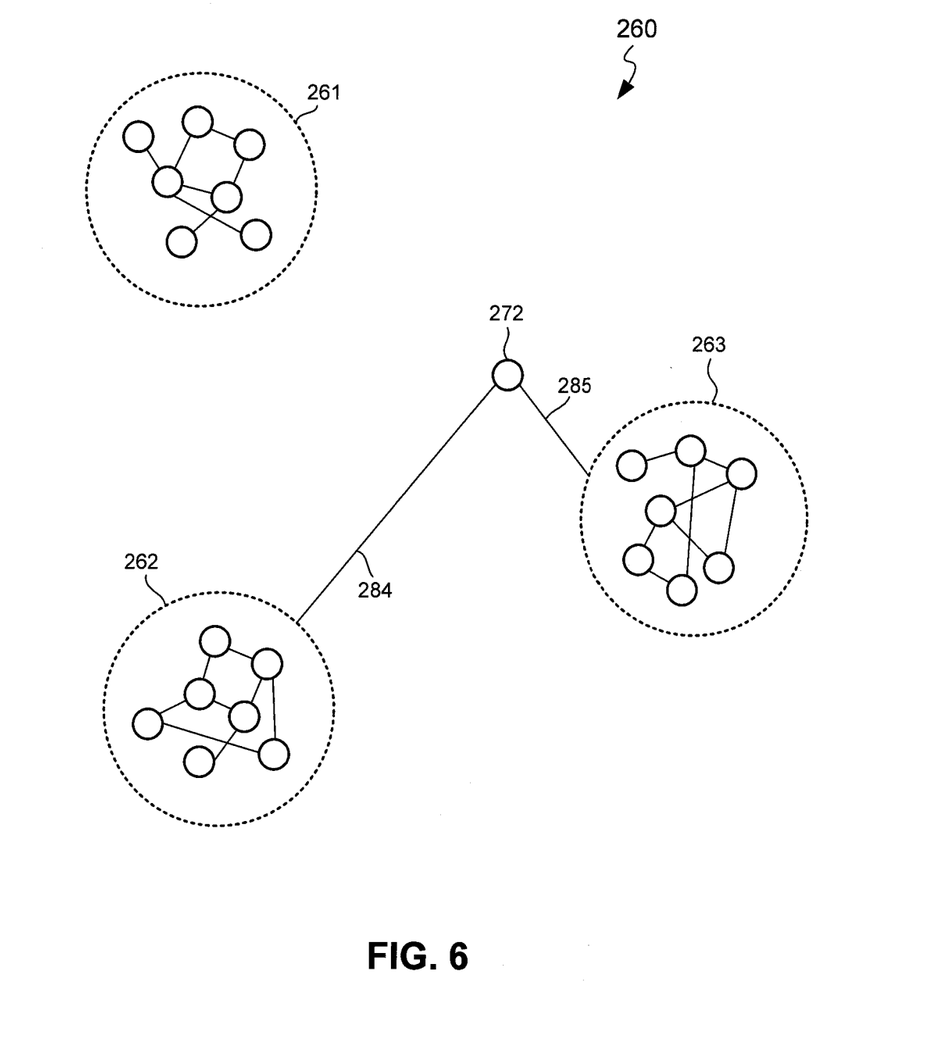

Continuing with FIG. 4, the phishing analysis module 223 calculates the betweenness centrality of each point on the MTA map 260. Generally speaking, betweenness centrality quantifies the number of times a point acts as a bridge along the shortest path between two other points. Betweenness centrality may be calculated using conventional algorithms commonly employed in graph theory. Assuming the point 271 has the highest betweenness centrality among all the point on the MTA map 260, the phishing analysis module 223 removes the point 271 from the MTA map 260, as schematically illustrated in FIG. 5. The phishing analysis module 223 thereafter removes the edges 281-283, which were previously connected to the now removed point 271, as schematically illustrated in FIG. 6. The removal of the edges 281-283 isolates the MTA group 261 from the rest of the MTA map 260. This makes the MTA group 261 a candidate for being included in the listing of reference MTA groups 224. In one embodiment, whether or not the MTA group 261 is included in the listing of reference MTA groups 224 depends on the modularity of the MTA group 261.

Figure 7:
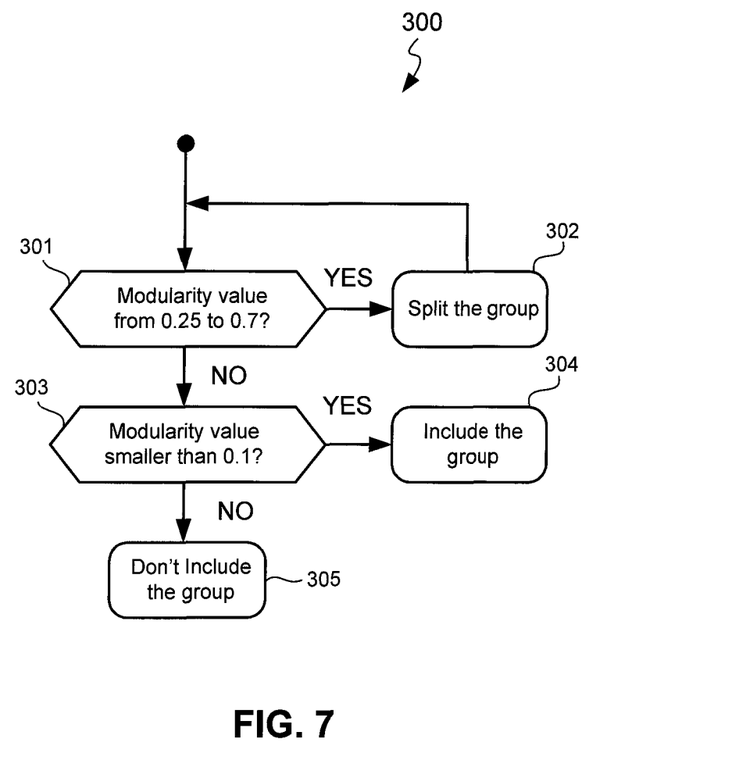
FIG. 7 shows a flow diagram of a method of finding reference MTA groups in accordance with an embodiment of the present invention.

FIG. 7 shows a flow diagram of a method 300 of finding reference MTA groups in accordance with an embodiment of the present invention. Generally speaking, modularity in the context of networks and graph theory is a measure of strength of division of a network or group of points in graphs. In the example of FIG. 7, modularity of an MTA group may be calculated using conventional algorithms commonly employed in network or graph theory. Modularity of an MTA group may have a value from 0.0 to 1.0, with a modularity of 1.0 indicating that the MTA group can be further split into smaller groups and a modularity of 0.0 indicating that that MTA group can no longer be split into smaller groups. The modularity values shown here may be varied to meet the needs of a particular application or algorithm used to calculate modularity.

In the example of FIG. 7, the phishing analysis module 223 calculates the modularity of each isolated MTA group, such as the MTA group 261 of FIG. 6. When the modularity of the isolated MTA group is between 0.25 and 0.7, the phishing analysis module 223 further splits the isolated MTA group into two or more MTA groups (step 301 to step 302). An MTA group may be split into smaller MTA groups by finding a point with highest betweenness centrality, removing that point and edges of that point, and finding isolated MTA groups that resulted from removing the edges as previously described. When the modularity of the isolated MTA group is not between 0.25 and 0.7 but is smaller than 0.1, the phishing analysis module 223 includes the isolated MTA into the listing of reference MTA groups 224 (step 301 to step 303 to step 304). Otherwise, when the modularity of the isolated MTA group is not between 0.25 and 0.7 but is not smaller than 0.1, the phishing analysis module 223 discards the isolated MTA group as not being suitable to be a reference MTA group (step 301 to step 303 to step 305).

Generally speaking, in the example of FIG. 7, an MTA group with a modularity greater than 0.1 indicates that the relationship between points in the MTA group is not tight. Put another way, a modularity greater than 0.1 means that there are not enough edges existing in the MTA group. On one extreme, an MTA group with a modularity of 1.0 indicates that there is no possibility of two points in the MTA group to have sent emails with the same signature. On the other extreme, an MTA with a modularity of zero indicates that two randomly chosen points in the MTA group have sent emails with the same signature. In the example of FIG. 7, a modularity threshold of 0.1 is chosen because the inventors believe that if an MTA group has a modularity less than 0.1, most points in the MTA group sent the emails with the same signature. Also, in the example of FIG. 7, an upper limit of 0.70 for modularity consideration is used because the inventors believe that an MTA group with a modularity greater than 0.70 has a very small chance of being split into smaller groups.

Each identified reference MTA group comprises a plurality of MTAs that are similar for having sent emails with the same signature. Each reference MTA group is thus associated with a particular email signature. That is, an MTA belonging to a reference MTA group sends emails with the same signature as other emails sent by other MTAs belonging to the same reference MTA group. Accordingly, when a particular MTA sends an email with a signature associated with a particular reference MTA group and that particular MTA is not a member of the particular reference MTA group, that particular MTA is deemed to be phishing.

Figure 8:
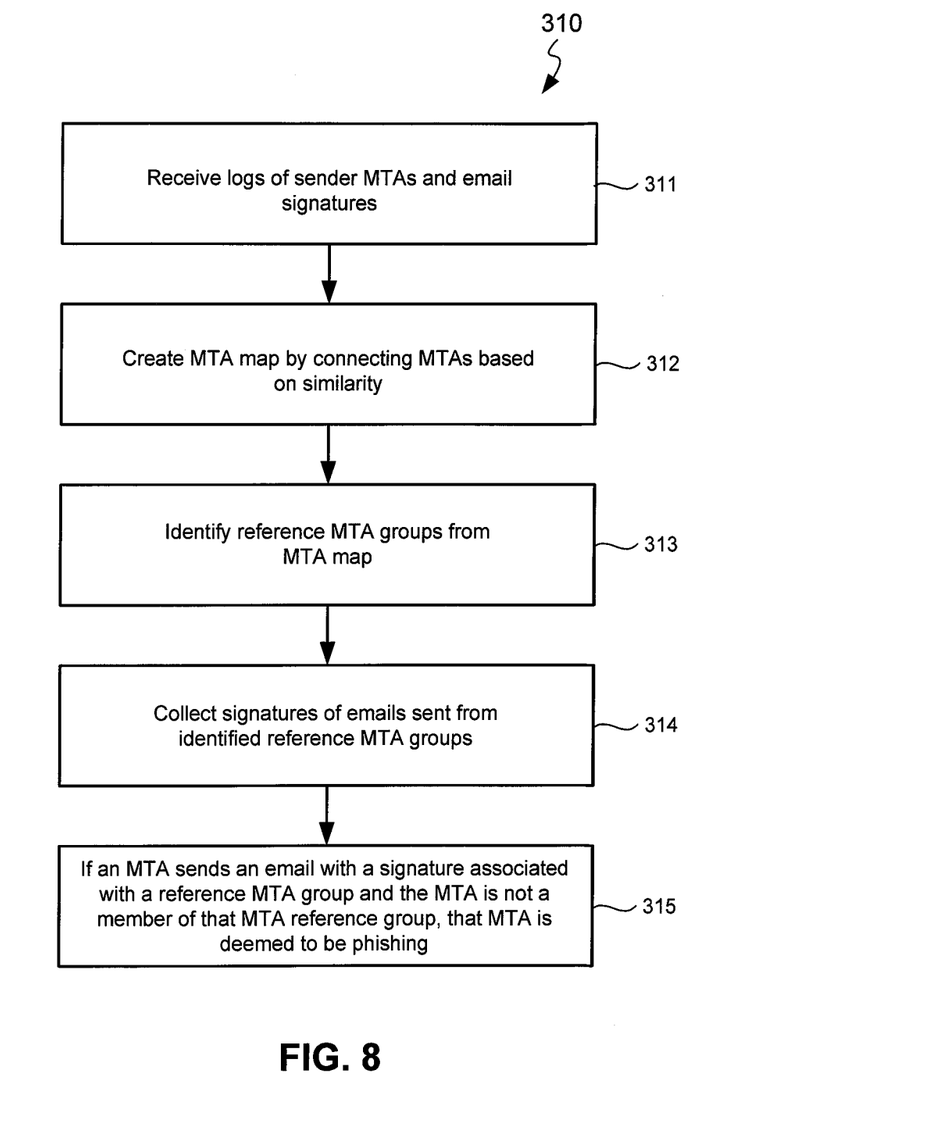
FIG. 8 shows a flow diagram of a method of detecting phishing in accordance with an embodiment of the present invention.

FIG. 8 shows a flow diagram of a method 310 of detecting phishing in accordance with an embodiment of the present invention. In one embodiment, steps 311 to step 313 are performed by the phishing analysis module 223, and the steps 314 and 315 are performed by a phishing detector 225. Other components may also be employed without detracting from the merits of the present invention.

In the example of FIG. 8, the phishing analysis module 223 receives logs of MTAs that sent emails, i.e., sender MTAs, and signatures of the emails they sent (step 311). The phishing analysis module 223 creates an MTA map having MTAs from the logs as points on the MTA map, and connects the points based on similarity between points (step 312). In one embodiment, the phishing analysis module 223 connects two points on the MTA map based on their similarity, with the similarity being a measure of the number of emails with the same signatures sent from the two points. For example, the higher the number of emails with the same signatures sent by the two points, the higher the similarity of the two points. After connecting the points on the MTA map, the phishing analysis module 223 identifies reference MTA groups from the MTA map (step 313). In one embodiment, the phishing analysis module 223 identifies reference MTA groups from the MTA map (as in step 313 of FIG. 8) in accordance with a method 320 of FIG. 9.

Figure 9:
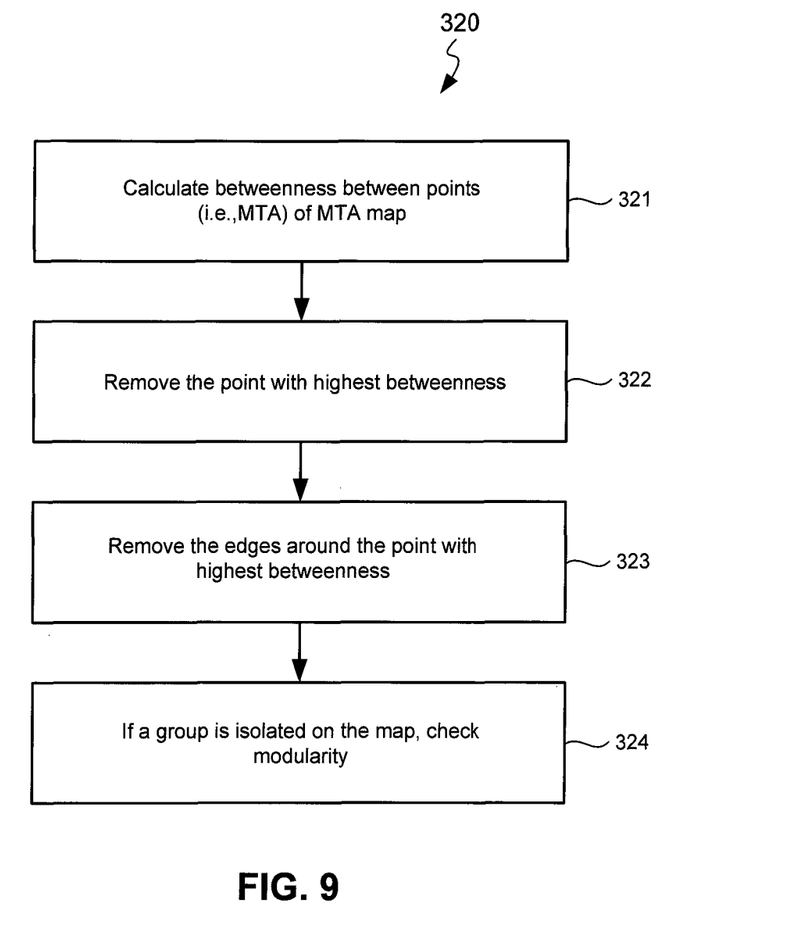
FIG. 9 shows a flow diagram of a method of identifying reference MTA groups from an MTA map in accordance with an embodiment of the present invention.

FIG. 9 shows a flow diagram of the method 320 of identifying reference MTA groups from an MTA map in accordance with an embodiment of the present invention. In the example of FIG. 9, the phishing analysis module 223 calculates the betweenness centrality of all points on the MTA map (step 321). The betweenness centrality of a point on the MTA map indicates the number of times the point serves as a bridge along the shortest path between two other points. The higher the betweenness centrality, the more the point acts as a bridge rather than as a member of a group of points. The phishing analysis module 223 removes the point with the highest betweenness centrality from the MTA map (step 322) and the edges around the point (step 323). When these last two steps result in an isolated group of points, the phishing analysis module 223 determines the modularity of the isolated group of points to determine whether or not the isolated group of points may be used as a reference group of points, i.e., a reference MTA group (step 324), as in the method 300 of FIG. 7. The phishing analysis module 223 may repeat the method 320 for the remaining points to identify additional reference group of points from the MTA map.

Continuing in FIG. 8, reference MTA groups identified by the phishing analysis module 223 from the MTA map may be output as a listing of reference MTA groups 224, which may be provided to a phishing detector 225. The phishing detector 225 may collect or receive signatures of emails sent by MTAs included in the listing of reference MTA groups 224 (FIG. 8, step 314). The phishing detector 225 may identify phishing by looking for an MTA that sends an email with a signature that is associated with a reference MTA group but MTA is not a member of the reference MTA group (step 315). That is, a particular MTA that sends an email with a signature that is the same as that of emails sent by MTAs of a reference MTA group but the particular MTA is not a member of the reference MTA group, the phishing detector 225 may deem the particular MTA as phishing.

As an example, assume the MTAs 203 and 204 of FIG. 2 belong to a first reference MTA group, and the MTA 202 is not a member of the first reference MTA group. In that example, the MTA 202 belongs to a second MTA reference group consisting of the MTAs 202 and 201. The phishing detector 225 may deem the MTA 202 to be phishing when the MTA 202 sends an email that has the same signature as emails sent by the MTAs 203 and 204.

Methods and apparatus for detecting phishing have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting phishing comprising:
receiving emails and Internet protocol (IP) addresses of a plurality message transfer agents (MTAs) that sent the emails;
creating an MTA map comprising a plurality of points, with each point in the plurality of points representing an MTA in the plurality of MTAs;
connecting points on the MTA map based on hashes of the emails;
identifying a plurality of reference MTA groups from the MTA map;
detecting that a first MTA sent a first email having a same hash as that of emails sent by MTAs in a first reference MTA group from the plurality of reference MTA groups, the first MTA not being a member of the first reference MTA group; and
in response to detecting that the first MTA sent the first email, deeming the first MTA to be phishing,
wherein connecting points on the MTA map comprises comparing hashes of emails sent from the plurality of points and determining a number of emails having a same hash sent by two points in the plurality of points, and
wherein identifying the plurality of reference MTA groups from the MTA map comprises determining betweenness centrality of each point in the plurality of points, identifying a first point in the plurality of points with a highest betweenness centrality, removing the first point from the MTA map, and identifying a group of MTAs isolated from other groups of MTAs upon removal of the first point from the MTA map.

2. The method of claim 1 further comprising:
collecting hashes of emails sent by MTAs in the plurality of reference MTA groups;
detecting that a second MTA in a second reference MTA group sent a second email having a same hash as that of emails sent by MTAs in a third reference MTA group, the second MTA not being a member of the third reference MTA group; and
in response to detecting that the second MTA sent the second email, deeming the second MTA to be phishing.

3. The method of claim 1 further comprising removing edges connecting the first point to other points on the MTA map.

4. A system comprising:
one or more computers with memory and a processor, the one or more computers
(a) receive emails and Internet protocol (IP) addresses of a plurality message transfer agents (MTAs) that sent the emails,
(b) create an MTA map comprising a plurality of points, with each point in the plurality of points representing an MTA in the plurality of MTAs,
(c) connect points on the MTA map based on hashes of the emails,
(d) identify a plurality of reference MTA groups from the MTA map,
(e) detect that a first MTA sent a first email having a same hash as that of emails sent by MTAs in a first reference MTA group from the plurality of reference MTA groups, the first MTA not being a member of the first reference MTA group, and
(f) in response to detecting that the first MTA sent the first email, deem the first MTA to be phishing,
wherein the one or more computers connect points on the MTA map by comparing hashes of emails sent from the plurality of points and determining a number of emails having a same hash sent by two points in the plurality of points, and
wherein the one or more computers identify the plurality of reference MTA groups from the MTA map by determining betweenness centrality of each point in the plurality of points, identifying a first point in the plurality of points with a highest betweenness centrality, removing the first point from the MTA map, and identifying a group of MTAs isolated from other groups of MTAs upon removal of the first point from the MTA map.

5. The system of claim 4 wherein the one or more computers collect hashes of emails sent by MTAs in the plurality of reference MTA groups,
detect that a second MTA in a second reference MTA group sent a second email having a same hash as that of emails sent by MTAs in a third reference MTA group, the second MTA not being a member of the third reference MTA group, and
in response to detecting that the second MTA sent the second email, deeming the second MTA to be phishing.

6. The system of claim 4 wherein the one or more computers remove edges connecting the first point to other points on the MTA map.

* * * * *